United States Patent [19]

Taneda

[11] Patent Number: 4,983,800
[45] Date of Patent: Jan. 8, 1991

[54] INTERELECTRODE DISTANCE CONTROLLING DEVICE IN ELECTRIC DISCHARGE MACHINING APPARATUS

[75] Inventor: Atsushi Taneda, Aichi, Japan

[73] Assignee: Mitsubishi Denki Kabushiki Kaisha, Tokyo, Japan

[21] Appl. No.: 382,933

[22] Filed: Jul. 21, 1989

[30] Foreign Application Priority Data

Jul. 27, 1988 [JP] Japan .................................. 63-187407

[51] Int. Cl.⁵ .......................... B23H 1/00; B23H 7/18
[52] U.S. Cl. .................................................. 219/69.16
[58] Field of Search .................. 219/69.16, 69.13, 69.2; 204/129.5, 129.7

[56] References Cited
U.S. PATENT DOCUMENTS 4,582,974  4/1986  Itoh ................................... 219/69.16
4,602,142  7/1986  Itoh ................................... 219/69.16

FOREIGN PATENT DOCUMENTS 49-8897   1/1974  Japan .
192425   10/1984  Japan ................................. 219/69.16
255312   12/1985  Japan ................................. 219/69.16

Primary Examiner—Geoffrey S. Evans
Attorney, Agent, or Firm—Sughrue, Mion, Zinn, Macpeak & Seas

[57] ABSTRACT

An interelectrode distance controlling device in an electric discharge machining apparatus which is capable of automatically setting the proportional constant for a drive unit for driving an electrode to machine a workpiece, so that the machining is performed with high accuracy and smoothly. Such an interelectrode distance controlling device, detects the oscillation of a system in an electric discharge machining apparatus during machining, and the device automatically sets the proportional constant to an optimum value in a range within which no oscillation occurs with the system.

3 Claims, 4 Drawing Sheets

INTERELECTRODE DISTANCE CONTROLLING DEVICE IN ELECTRIC DISCHARGE MACHINING APPARATUS

BACKGROUND OF THE INVENTION

This invention relates to a device for controlling an interelectrode gap in an electric discharge machining apparatus.

An electric discharge machining apparatus is well known in the art, in which an electrically conductive material such as metal is molten and machined by using high temperature energy which is generated by an electric discharge.

In the electric discharge machining apparatus, a pulse current is, in general, used as electrical energy. In order to maintain an electric discharge by using the pulse current, it is essential to suitably determine the distance between a tool electrode and a workpiece; that is; an interelectrode gap. The workpiece is partially molten and removed while being machined by the electric discharge. Therefore, in the case where the electrode and the workpiece are fixedly held, the interelectrode distance is gradually increased, as a result of which it becomes difficult to induce electric discharges, and finally the interelectrode distance is made so large that the electric discharge is stopped.

In order to overcome this difficulty; that is, in order to maintain the electric discharge constant, in general a method is employed in which, as the workpiece is machined, the electrode is moved towards the workpiece so as to maintain the interelectrode distance constant.

On the other hand, during an electric discharge machining, sludge is created between the electrodes (between the electrode and the workpiece) by the electric discharges, and usually it is washed away with a machining solution. However, in the case where the machining solution is not sufficiently supplied between the electrodes, or the interelectrode distance is small, often the electrodes are bridged with the sludge; that is, they are electrically short-circuited with the sludge. In this case, voltage high enough to induce electric discharge is not developed across the electrodes, as a result of which the electric discharge is stopped, or a large current is concentrated to damage the workpiece. In these cases, the interelectrode distance is increased to remove the part bridged or short-circuited by the sludge, or the machining solution flow path is improved.

As is apparent from the above description, an electric discharge machining operation is carried out by controlling (increasing and decreasing) the interelectrode gap; i.e., by maintaining the interelectrode distance substantially constant in average. The control of the interelectrode distance is a fundamental function which greatly affects the result of the electric discharge machining operation; i.e., the product in quality.

As was described above, the control and maintenance of the interelectrode distance are fundamental and essential for an electric discharge machining operation. However, it is considerably difficult to measure the interelectrode distance during electric discharge, and practice, it is impossible to do so. Consequently, the quantity of state substantially equivalent to an interelectrode distance is detected to thereby determine the interelectrode distance, and the interelectrode distance thus determined is compared with a value most suitable for the continuation of an electric discharge, for control of the interelectrode distance.

FIG. 2 is a block diagram showing one example of a conventional quantity-of-state detecting system.

In the detecting system of FIG. 2, an average value 10 of interelectrode voltages obtained from an interelectrode voltage waveform 8 is utilized for determination of an interelectrode distance. The method is so-called "an average voltage servo system". It is experimentally confirmed that the interelectrode voltage average value 10 is proportional to an interelectrode gap. Therefore, control is so made that, when the average voltage is higher than a target value, or specified value 1, the interelectrode distance is decreased so as to facilitate the occurrence of electric discharge, whereas when the average voltage is lower than the specified value 1, the interelectrode distance is increased so as to suppress the electric discharge. Thus, the electric discharge is maintained satisfactory by the control described above.

In the case where the interelectrode distance is increased because the system suffers from a disturbance due to a machining speed 5, a drive device is operated to move the electrode to maintain the interelectrode distance constant.

The increase of the interelectrode distance appears in the interelectrode voltage waveform through an interelectrode phenomenon; that is, electric discharges become rather difficult to induce. When electric discharges become rather difficult to induce, because of the reason indicated in FIG. 4 the interelectrode average voltage 10 is increased to a value 10b, thus differing from the specified value. The difference 11 therebetween, after being multiplied by a proportional constant 3, is supplied to a drive unit 4 as a signal for driving the drive unit 4. When the drive unit 4 feeds the electrode as much as the increase of the interelectrode gap, the interelectrode distance is set to the original value with which electric discharges occur satisfactorily, and the interelectrode average value is set to a value 10a; that is, it becomes equal to the specified value 1 again.

If, in the above-described operation, the proportional constant 3 is set to an excessively large value, the drive unit 4 will feed the electrode more than the increase of the interelectrode distance which has been caused by electric discharge machining, as a result of which the interelectrode distance is made shorter. In this case, the interelectrode average voltage is decreased, so that a signal to increase the interelectrode distance is applied to the drive unit 4. Whereby the electrode is moved to increase the interelectrode gap. However, in this case, the interelectrode average voltage 10 and the drive unit 4 are placed in an oscillation state, thus being much away from their ideal state. If, in contrast, the proportion constant 3 is excessively small, then a delay time required for restoring the system is increased, and it becomes impossible to quickly respond to the disturbance applied as a machining speed to the system. Thus, in this case also, it is difficult to maintain the electric discharge satisfactory.

As is apparent from the above description, it is necessary that the proportional constant 3, called "gain", is always set to the best value.

FIG. 3 is a diagram showing an electric circuit which practices the method and system described with reference to FIG. 2. In FIG. 3, parts corresponding functionally to those which have been described with reference to FIG. 2 are therefore designated by the same reference numerals of characters. In FIG. 3, reference numeral 20 designates a power source for supplying discharge energy; 21, a resistor for regulating the discharge energy as a current; 22, a switching element for forming a pulse current waveform; 23, an oscillator for the switching element; 24, an electrode; 25, a workpiece to be machined; 26, a machining vessel; and 27, a machining solution.

As is clear from the above description, in an electric discharge machining apparatus, in order to machine a workpiece with high efficiency, it is necessary to control at all times against disturbances such as the advancement of the machining operation and the formation of sludge which may adversely affect the interelectrode gap condition. For this purpose, it is essential to set to the best value the proportional constant, i.e., a gain for the drive unit adapted to change the interelectrode distance.

With the electric discharge machining apparatus, the best proportional constant, which varies depending on the machining speed, the machining current, the electrode area and the like is generally determined by the operator through his past experience or according to the machining conditions. Thus, the setting of the proportional constant is considerably difficult; however, it must be carried out frequently during machining operation.

SUMMARY OF THE INVENTION

Accordingly, an object of this invention is to provide an interelectrode distance control device in which the proportional constant for a drive unit is automatically set to the best value, and during machining, control against changes in machining conditions is performed smoothly, whereby it is unnecessary to use the operator's experience; that is, an unmanned electric discharge machining operation is carried out with high efficiency.

The above, and other objects of the present invention is met to the provision of a device for controlling an interelectrode distance in an electric discharge machining apparatus to maintain electric discharge conditions constant, which comprises a detector for detecting a quantity of state to be controlled from a quantity of states representing an electric discharge condition, a first band-pass unit having a center frequency which is equal to the oscillation frequency of the electric discharge machining apparatus, a second band-pass unit having a center frequency different from the center frequency of the first band-pass unit, a difference arithmetic unit for calculating the difference between the quantities of state passed through the first and second band-pass units, and a variable gain amplifier which changes the gain thereof according to an output data of the difference arithmetic unit, amplifies the deviation data of the quantity of state to be controlled from a target value and applies said deviation data to a electrode drive unit.

The interelectrode distance controlling device according to the invention detects the oscillation of the system in an electric discharge machining apparatus during machining, and automatically sets the proportional constant to the optimum value in the range with which no oscillation occurs with the system.

DESCRIPTION OF THE PREFERRED EMBODIMENT

First, the principle of this invention will be described.

In general, the oscillation of the system can be read by frequency analysis of signals observed in the system.

Figure 5:
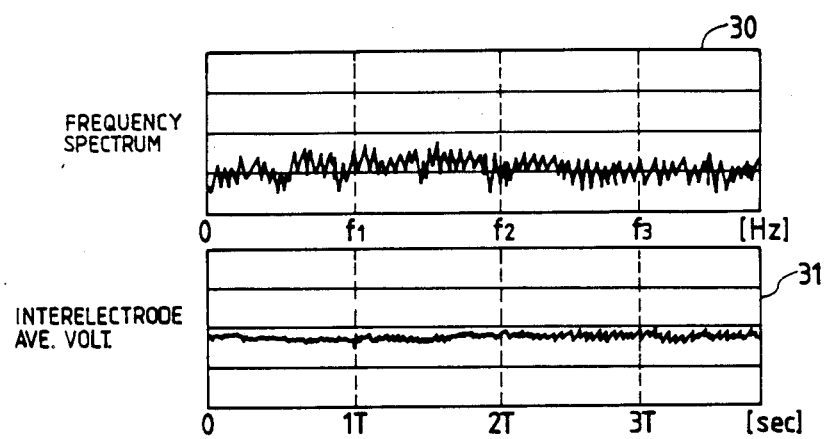
FIGS. 5a and 5b show an explanatory diagrams indicating interelectrode average voltages and frequency spectra with time during electric discharge machining operation.
Figure 5:
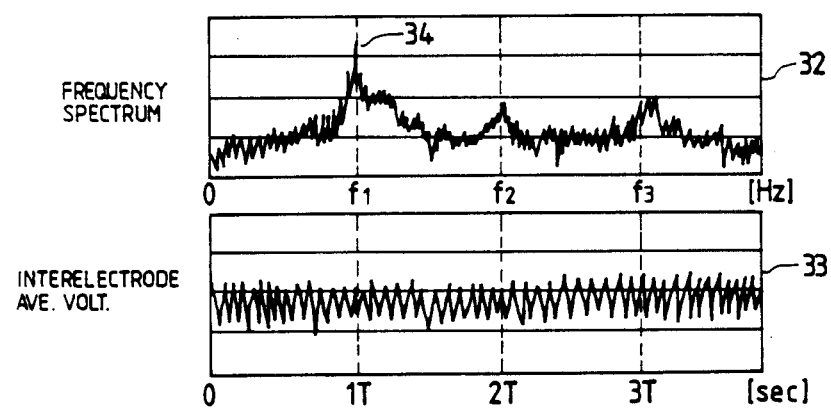

FIG. 5 shows the measurement and analysis of interelectrode voltages an as index for determination of the state of the system during machining. More specifically, parts (30), (31), (32) and (33) of FIG. 5a and 5b show interelectrode average voltages and frequency analyses in the cases where the proportional constant 3 is respectively set to an optimum value and to the value with which oscillation occurs.

In the case where the proportional constant is set to the optimum value, the interelectrode average voltage slightly oscillate around a certain value (as indicated in the part (31)). On the other hand, in the case where it is in the state of oscillation with the proportional constant being set to an excessively large value, it is found through analysis of the frequency spectrum that the oscillation occurs with a frequency f1 (as shown in the parts (32) and (33)). In the part (32), reference characters f2 and f3 designate the higher harmonics thereof. If, under this oscillating condition, the proportional constant is decreased gradually, then the peaks at the frequencies f1, f2, f3 and so forth are gradually decreased, as a result of which a spectrum having a relatively flat characteristic as shown in the part (31) is obtained. If the proportional constant is further decreased (not shown), then the average voltage is lowered in response characteristic, and therefore only one dull peak is formed in an extremely low frequency range.

As is apparent from the above description, with respect to a data signal to be controlled, the frequency analysis will permit the objective detection of electric discharge conditions, with the result that the proportional constant can be set to the best value.

A frequency spectrum analysis is to extract frequency components from a signal, and detect the levels. However, in general, the analysis requires a considerably long period of time and large equipment. Accordingly, in view of time saving and economical use it is not practical to provide such equipment for an electric discharge machine.

However, during electric discharge machining, the oscillation frequency of the system depends on the system itself; that is, it is known in advance. Accordingly, it is unnecessary to detect oscillation for all frequencies. That is, the principle of the invention resides in that only the signal level of the known frequency component is detected to detect the oscillation of the system.

In general, when the system is in oscillation, the oscillation frequency depends on the system; however, in the case of an electric discharge machine, the oscillation frequency is substantially constant, and it being less affected by machining conditions and electrode configuration. In FIG. 5a and 5b, the oscillation frequency of the system is designated by reference character f1, and its higher harmonics by reference characters f2 and f3. Therefore, if the signal is detected at the frequency f1 and another frequency, then the oscillation of the system can be detected.

With respect to the oscillation frequency of the system, there may be a variety of resonances such as those at the resonance frequency of the position system, the resonance frequency of the speed system, and the resonance frequency of the system existing in the internal system. Of the systems, the innermost system is most liable to oscillate; however, depending on the quantity of state to be controlled the oscillation may occur with the frequency of the internal loop. In the control of the interelectrode distance in the electric discharge machine, there are different modes of oscillation; that is, the oscillation of the position system and that of the speed system are available, and therefore the frequency for detection of the oscillation of the system should be determined according to the quantity of state to be controlled.

Figure 1:
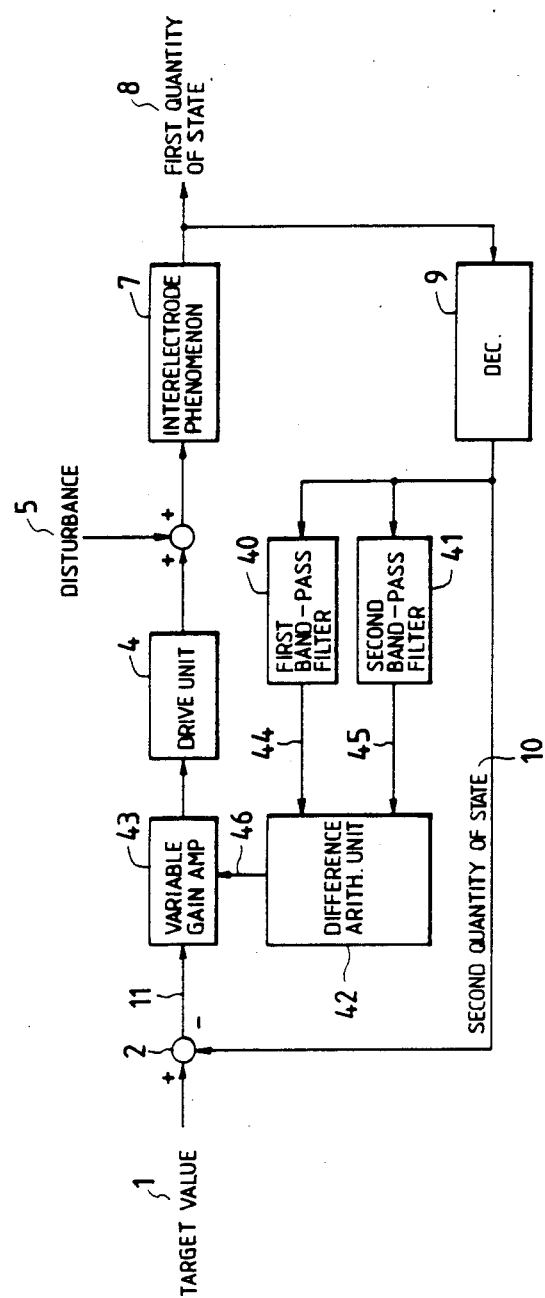
FIG. 1 is a block diagram showing an example of an interelectrode distance controlling device according to the present invention.
Figure 2:
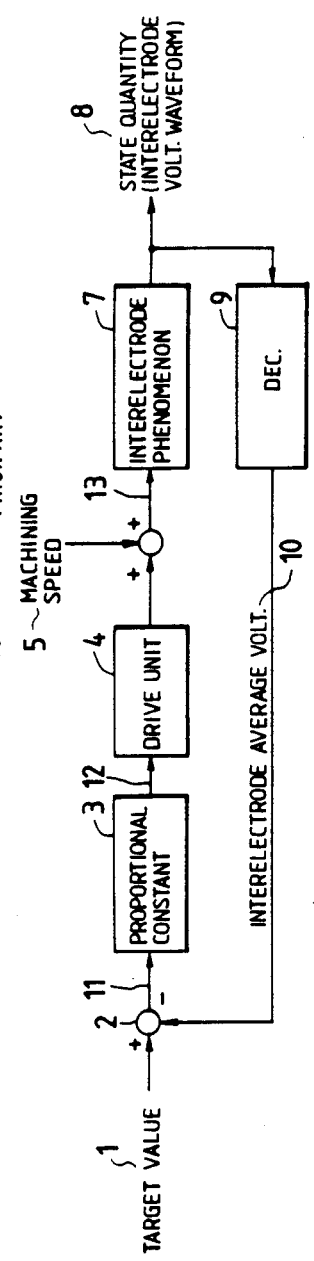
FIG. 2 is a block diagram showing a conventional interelectrode distance controlling machine.
Figure 3:
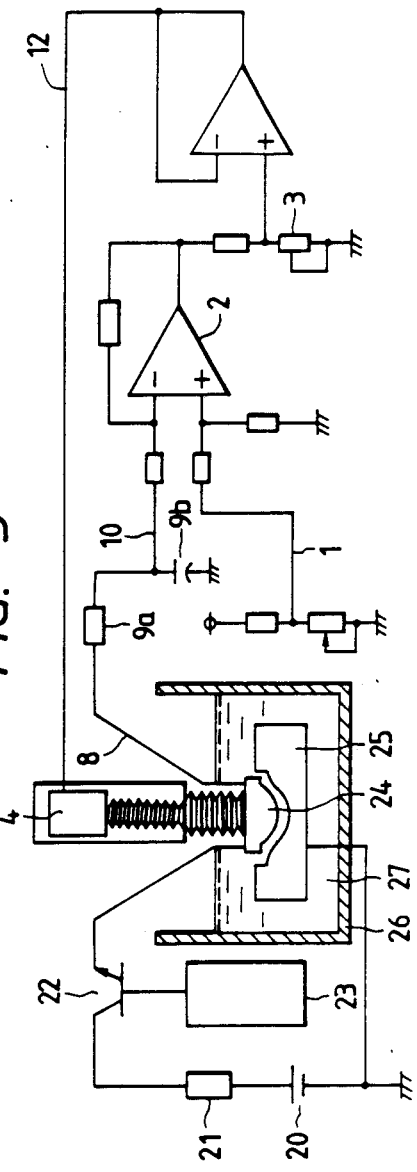
FIG. 3 is a circuit diagram, partly as an explanatory diagram, showing an electric discharge machining apparatus with the conventional interelectrode distance controlling device shown in FIG. 2.
Figure 4:
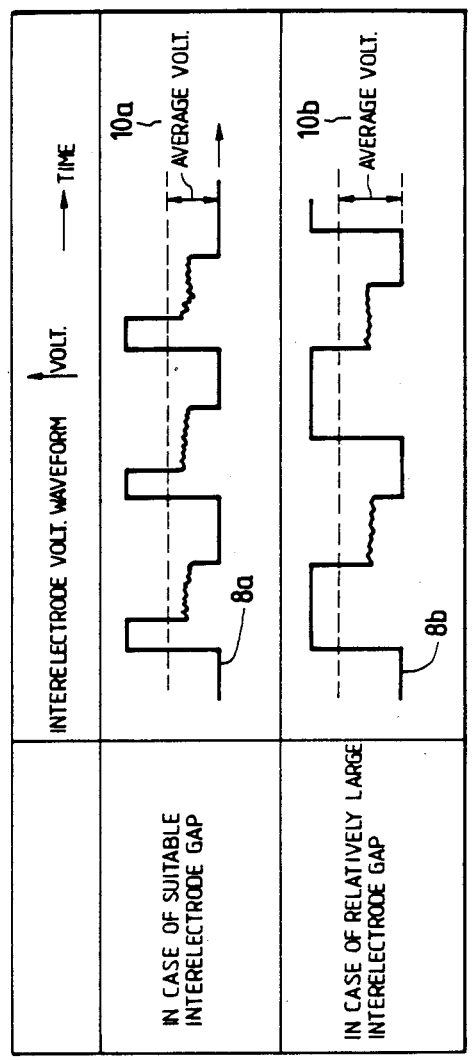
FIG. 4 an explanatory diagram showing a change in an interelectrode voltage waveform due to a change in an interelectrode gap, and a change in an average voltage attributing thereto.

One embodiment of the invention based on the above-described principle is as shown in FIG. 1. A first quantity of state 8 is the quantity of information which can represent the interelectrode discharge condition. With a first quantity-of-state detecting unit 9, data to be controlled, namely, a second quantity of state 10 is detected from the first quantity of state. In the case of FIG. 2, the first quantity of state 8 is the interelectrode voltage waveform, the first quantity-of-state detecting unit 9 is a low-pass filter, and the second quantity of state 10 is the interelectrode average voltage.

Two band-pass filters are provided for the second quantity of state which can represent the characteristic of the system.

The first band-pass filter 40 has a center frequency which is equal to the oscillation frequency of the system, and it is used to detect the signal level at the resonance frequency detected. The second band-pass filter 41 has a center frequency different from that of the first band-pass filter 40. It is preferable that the center frequency of the second band-pass filter is a half ($\frac{1}{2}$) of the center frequency of the first band-pass filter. The reason why the center frequency of the second band-pass filter 41 is selected lower than that of the first band-pass filter 40 is to make it possible to detect the state that the gain of a variable gain amplifier 43 is excessively low. By setting the center frequency of the second band-pass filter to a half of that of the first band-pass filter, the detection accuracy can be increased. The mode of oscillation to be selected for the oscillation frequency of the system should be determined according to the kind of the first quantity of state used for control.

A difference arithmetic unit 42 calculates the difference between the two signal levels, and applies the resultant difference signal 46 to the variable gain amplifier 43.

The variable gain amplifier 43, according to the difference signal 46 received from the difference arithmetic unit 42, increases the gain when the signal 44 is smaller than the signal 45; and decreases the gain when the signal 44 is larger than the signal 45, until the difference signal 46 is made equal to zero through the drive unit 4, the interelectrode phenomenon 7, the first quantity of state 8 and the second quantity of state 10.

As a result, the state response of the system including electric discharge machining operations can be improved maximumly, and the occurrence of oscillation can be prevented which is caused by increasing the state response excessively. Thus, in response to the change in machining condition, the electric discharge machining operation can be carried out ideally; that is, it can be achieved with high efficiency.

In forming the control device according to the invention, the elements may be provided effectively as follows:

The interelectrode voltage waveform as shown in FIG. 2 is employed as the first quantity of state, whereas its average voltage is employed as the second quantity of state, or the period of time which elapses from the time instant that voltage is applied between the electrodes until electric discharge starts is employed as the second quantity of state. Instead of the interelectrode voltage waveform, the electrode's positional coordinate data may be used, and in addition, the electrode' speed data may be employed. These should be used selectively according to the control method.

The first band-pass filter 40 or the second band-pass filter 41 is generally an electronic circuit made up of resistors and capacitors; however, it may be a so-called "digital filter" in which the second quantity of state 10 is read with a discrete value system and processed by software. This system is advantageous in that the frequency band can be changed with the aid of a program, and therefore when a control method is selected according to machining conditions, the filters can be modified into suitable ones with ease; that is, the method have a wide range of application.

In general, the difference arithmetic unit 42 is a hardware circuit made up of operational amplifiers. However, it may be so designed that the above-described data read as digital data and processed by software is further processed for difference by software.

The variable gain amplifier 43 may be a hardware circuit comprising operational amplifiers; however, it may be realized by using software.

In other words, each block in FIG. 1 may be made up of an electronic circuit. However, the blocks may be formed by using software which are used from the instant that, simultaneously when the first quantity of state 8 is detected, the continuous data is converted into discrete data until the signal including the specified target value 1 is applied to the drive unit 4. The drive unit 4 can be driven by converting the final output from discrete data into continuous data; i.e., by digital-to-analog conversion. Recently, there has been provided a method of using the digital data as it is, to drive the drive unit.

As is apparent from the above description, with the control device of the invention, the interelectrode distance of the electric discharge machining apparatus, so that the electric discharge is maintained ideal not depending on the machining speed, electrode area or machining conditions. Therefore, an unmanned electric discharge machine which performs an electric discharge machining operation with high accuracy and with high efficiency can be provided according to the invention.

What is claimed is:

1. A device for controlling an interelectrode distance in an electric discharge machine comprising a driveable electrode means and a plurality mechanical/electrical systems, each having an operating parameter representing an oscillation frequency of said electric discharge machine, to maintain electric discharge conditions constant comprising:

a drive unit for driving the electrode means;

a detector for detecting a discharge condition parameter to be controlled from a plurality of operating parameters representing an electric discharge condition and for generating a detected output;

a first band-pass filter means having a center frequency which is equal to the oscillation frequency of said electric discharge machine and being responsive to said detected output to generate a first filtered signal;

a second band-pass filter means having a center frequency different from the center frequency of said first band-pass unit and being responsive to said detected output to generate a second filtered signal;

a difference arithmetic unit responsive to said first and second filtered signals for calculating the difference between the detected output representative of the discharge condition parameters and passed through said first and second band-pass units and for identifying said difference as output data; and a variable gain amplifier which changes the gain thereof according to said output data of said difference arithmetic unit, and amplifies the deviation data of said discharge condition parameter to be controlled from a target value and applies said deviation data to an electrode drive unit.

2. The device as defined in claim 1 wherein the center frequency of said second band-pass filter means being one-half of the center frequency of said first band-pass filter means.

3. The device as defined in claim 1, wherein said variable gain amplifier increase the gain when the output of said first band-pass filter means is smaller than the output of said second band-pass filter means, where as said variable gain amplifier decreases the gain when the output of said first band-pass filter means is larger than the output of said second band-pass filter means.

* * * * *